(12) United States Patent
Shirai et al.

(10) Patent No.: US 8,073,140 B2
(45) Date of Patent: Dec. 6, 2011

(54) ENCRYPTION/DECRYPTION DEVICE, ENCRYPTION/DECRYPTION METHOD, AND COMPUTER PROGRAM

(75) Inventors: Taizo Shirai, Kanagawa (JP); Kyoji Shibutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 605 days.

(21) Appl. No.: 12/160,895

(22) PCT Filed: Jan. 4, 2007

(86) PCT No.: PCT/JP2007/050009
§ 371 (c)(1),
(2), (4) Date: Jul. 15, 2008

(87) PCT Pub. No.: WO2007/083528
PCT Pub. Date: Jul. 26, 2007

(65) Prior Publication Data
US 2010/0226493 A1     Sep. 9, 2010

(30) Foreign Application Priority Data
Jan. 17, 2006   (JP) .................................. 2006-008695

(51) Int. Cl.
*H04L 9/00* (2006.01)
(52) U.S. Cl. .......................................................... 380/29
(58) Field of Classification Search .................. None
See application file for complete search history.

(56) References Cited

U.S. PATENT DOCUMENTS

| 7,433,470 B2 | 10/2008 | Shirai et al. |
| 2003/0048903 A1* | 3/2003 | Ito et al. .................. 380/263 |
| 2005/0111659 A1 | 5/2005 | Shirai et al. |
| 2008/0056490 A1 | 3/2008 | Akishita et al. |

FOREIGN PATENT DOCUMENTS

| JP | 10-116029 | 5/1998 |
| JP | 2003-37482 | 2/2003 |
| JP | 2005-107078 | 4/2005 |
| JP | 2005-309148 | 11/2005 |

OTHER PUBLICATIONS

Satoh, Akashi et al., "Unified Hardware Architecture for AES and Camellia", The 2003 Symposium on Cryptography and Information Security, The Institute of Electronics, Information and Communication Engineers, vol. II of II, pp. 941-946, 2003, (with English translation).

(Continued)

*Primary Examiner* — Brandon Hoffman
(74) *Attorney, Agent, or Firm* — Oblon, Spivak, McClelland, Maier & Neustadt, L.L.P.

(57) ABSTRACT

It is possible to realize a Feistel-type common key block encryption/decryption processing configuration capable of reducing data stored in a memory at a low cost. The Feistel-type common key block encryption/decryption processing repeatedly executes an SP-type F function having nonlinear and linear transform sections by several rounds. At least one of the nonlinear and linear transform processes executed in the F function in each round is executed as a transform process identical with a transform process applied to an encryption/decryption algorithm other than a Feistel-type common key block encryption/decryption algorithm and/or another hash function such as AES and Whirlpool. With this configuration, it is possible to reduce the design cost and the amount of data stored in a memory.

15 Claims, 5 Drawing Sheets

OTHER PUBLICATIONS

Watanabe, Dai et al., "A New Keystream Generator MUGI", 9$^{th}$ International Workshop, FSE 2002, FAST Software Encryption, Springer, LNCS 2365, pp. 179-194, (2002).

Shirai, Taizo et al., "Improving Immunity of Feistel Ciphers Against Differential Cryptanalysis by Using Multiple MDS Matrices", 11$^{th}$ International Workshop, FSE 2004, Fast Software Encryption, Springer, LNCS 3017, pp. 260-278, (2004).

Shirai, Taizo et al., "On Feistel Ciphers Using Optimal Diffusion Mappings Across Multiple Rounds", 10$^{th}$ International Conference on the Theory and Application of Cryptology and Information Security, Advances in Cryptology Asiacrypt 2004, LNCS 3329, pp. 1-15, (2004).

Shirai, Taizo et al., "On Feistel Structures Using a Diffusion Switching Mechanism", 13$^{th}$ International Workshop, FSE 2006, Fast Software Encryption, Springer, LNCS 4047, pp. 41-56, (2006).

Owada, Toru et al., "Unified Hardware Implementation of MUGI, AES and SHA-1/256", The 2006 Symposium on Cryptography and Information Security, The Institute of Electronics, Information and Communication Engineers, 2006, (with English translation).

Shirai, Taizo et al. "The 128-bit Blockcipher CLEFIA", Fast Software Encryption 2007 Videos and Slides, (2007).

U.S. Appl. No. 10/577,955, filed May 2, 2006, Shirai, et al.

U.S. Appl. No. 12/161,898, filed Jul. 23, 2008, Shibutani, et al.

U.S. Appl. No. 11/909,544.

U.S. Appl. No. 12/780,512, filed May 14, 2010, Shirai, et al.

Extended Search Report issued May 6, 2011 in Europe Application No. 07706356.8.

Office Action issued Jun. 28, 2011, in Japanese Patent Application No. 2006-008695.

Hitachi, Ltd., Specification of a quasi-random number generator MUGI Ver 1.3, [online], May 8, 2002, CRYPTREC, [Jun. 17, 2011 search], Internet <URL:http://www.cryptrec.go.jp/method.html>.

Akashi Sato, Sumio Morioka, A shared hardware architecture of AES and Camellia, 2003 encryption and information security symposium proceeding, Jan. 26, 2003, vol. II of II, p. 941-946.

Paulo S.L.M. Barreto, The Whirlpool Hash Function, [online], May 24, 2003 [Jun. 17, 2011 search], Internet <URL:http://web.archive.org/web/20031205153808/http://planeta.terra.com.br/informatica/paulobarreto/WhirlpoolPage.html>.

\* cited by examiner

ENCRYPTION/DECRYPTION DEVICE, ENCRYPTION/DECRYPTION METHOD, AND COMPUTER PROGRAM

TECHNICAL FIELD

The present invention relates to an encryption/decryption processing device, an encryption/decryption processing method and a computer program. To put it in detail, the present invention relates to an encryption/decryption processing device, an encryption/decryption processing method and a computer program for carrying out Feistel-type common key block encryption/decryption processing.

BACKGROUND ART

Accompanying development of network communications and electronic business transactions recently, assurance of securities in communications becomes an important problem. A method for assuring securities is adoption of cryptographic technologies. In recent years, communications making use of a variety of cryptographic technologies are actually carried out.

For example, a system for carrying out authentication processing or a system for encrypting and decrypting transceiving data has been implemented. In the system, an encryption/decryption processing module is embedded in a small-size device such as an IC card. A reader/writer functioning as a data read/write device carries out communications with the IC card in order to exchange the data with the IC card.

There are a variety of encryption/decryption algorithms largely classified into a public key cryptosystem and a common key cryptosystem. In accordance with the public key cryptosystem, encryption and decryption keys are set as different keys such as public and secret keys. In accordance with the common key cryptosystem, encryption and decryption keys are set as a common key.

The common key cryptosystem includes a variety of algorithms. In accordance with one of the algorithms, the common key is used as a base for generating a plurality of keys to be utilized in repetitively executing data transform processing for transforming data in block units such as 64-bit block units and 128-bit block units. An algorithm of a common key block cryptosystem is a representative algorithm adopted in such a key generation method and the data transform processing.

In accordance with the representative algorithm of the common key block encryption/decryption, the data transform process carried out in the common key block encryption/decryption processing includes nonlinear and linear transforms. Thus, when designing an elemental cryptographic technology such as the common key block cryptographic technology, it is necessary to determine a transform function for carrying out the nonlinear transform and a matrix to be used in a linear transform process.

For example, if encryption/decryption processing operation is to be carried out in an IC card, hardware for implementing an encryption/decryption algorithm must be embedded and data including a program (a software program) must be stored in a memory included in the hardware.

In recent years, attempts to enhance convenience are made in order to make it no longer necessary for the user to own a number of cards by, for example, providing an information processing terminal such as an IC card or a hand phone with a variety of data processing functions. However, in this case, it is necessary to make it compatible with encryption/decryption algorithms adopted in the operation system of every institution. In order to provide an information processing terminal such as an IC card or a hand phone with a configuration capable of carrying out a plurality of encryption/decryption algorithms different from each other, it is necessary to provide a hardware for executing the algorithms and include software for implementing the algorithms in the information processing terminal, causing a problem of a high cost.

DISCLOSURE OF INVENTION

Technical Problem

It is thus an object of the present invention addressing the problems described above to provide an encryption/decryption processing device, an encryption/decryption processing method and a computer program, having a design cost reduced and the amount of data stored in a memory decreased due to the use of the common components, by implementing data transform common to the data transform adapted to such as another encryption/decryption algorithm or another hash function, in a configuration for carrying out Feistel-type common key block encryption/decryption processing.

To put it more concretely, the present invention provides an encryption/decryption processing device having a hardware implementation cost reduced by making at least some hardware required for carrying out nonlinear and linear transform processes as hardware common to the processes in different kinds of encryption/decryption processing based on different algorithms and/or different hash functions and having a code size reduced by making use of common modules in the implementation of at least some software required for carrying out the processes, provides an encryption/decryption processing method and provides a computer program.

Technical Solution

In accordance with a first aspect of the present invention, there is provided an encryption/decryption processing device including an encryption/decryption processing section for carrying out Feistel-type common key block encryption/decryption processing repeating an SP-type F function used in execution of data transform processing including nonlinear and linear transform processes in a plurality of rounds, in which the encryption/decryption processing section is configured to carry out at least one of the nonlinear and linear transform processes applying the F function executed in the rounds as a data transform process identical with a data transform process applying an encryption/decryption algorithm other than the algorithm of the Feistel-type common key block encryption/decryption or applying another hash function.

In addition, in accordance with an embodiment implementing the encryption/decryption processing device provided by the invention, the encryption/decryption processing section has a characteristic that is configured to selectively apply at least two or more matrixes different from each other to the linear transform process carried out in the rounds and at least one of the selected matrixes is a matrix applied to the encryption/decryption algorithm other than the algorithm of the Feistel-type common key block encryption/decryption processing or the other hash function.

In addition, in accordance with an embodiment implementing the encryption/decryption processing device provided by the invention, the encryption/decryption processing section has a characteristic that is configured to selectively apply two matrixes $M_0$ and $M_1$ different from each other to the linear transform process carried out in the rounds in such a way that the order of application of the two matrixes $M_0$ and $M_1$ different from each other satisfies the following conditions (a) and (b):

(a) $M_0$ is followed by $M_1$ in a sequence of aforementioned odd-numbered rounds;

(b) $M_0$ is followed by $M_1$ in a direction starting from the last stage in the sequence of even-numbered rounds.

In addition, in accordance with an embodiment implementing the encryption/decryption processing device provided by the invention, the encryption/decryption processing section has a characteristic that is configured to selectively apply three matrixes $M_0$, $M_1$ and $M_2$ different from each other to the linear transform process carried out in at the rounds in such a way that the order of application of the three matrixes $M_0$, $M_1$ and $M_2$ different from each other satisfies the following conditions (a) and (b):

(a) $M_0$ is followed by $M_1$ to be followed by $M_2$ in a sequence of odd-numbered rounds;

(b) $M_0$ is followed by $M_1$ to be followed by $M_2$ in a direction starting from the last stage in the sequence of even-numbered rounds.

In addition, in accordance with an embodiment implementing the encryption/decryption processing device provided by the invention, the encryption/decryption processing section has a characteristic that is configured to carry out 64-bit Feistel-type common key block encryption/decryption processing, and selects at least one of matrixes as matrixes to be used in the linear transform process carried out in the rounds is a matrix applied to an AES encryption/decryption algorithm.

In addition, in accordance with an embodiment implementing the encryption/decryption processing device provided by the invention, the encryption/decryption processing section has a characteristic that is configured to selectively implement both the AES encryption/decryption algorithm and the algorithm of the 64-bit Feistel-type common key block encryption/decryption processing.

In addition, in accordance with an embodiment implementing the encryption/decryption processing device provided by the invention, the encryption/decryption processing section has a characteristic that is configured to carry out 128-bit Feistel-type common key block encryption/decryption processing, and selects at least one of matrixes as matrixes to be used in the linear transform process carried out in the rounds is a matrix applied to a Whirlpool hash function.

In addition, in accordance with an embodiment implementing the encryption/decryption processing device provided by the invention, the encryption/decryption processing section has a characteristic that is configured to selectively implement the algorithms of both the Whirlpool hash function and the 128-bit Feistel-type common key block encryption/decryption processing.

In accordance with a second aspect of the present invention, there is provided an encryption/decryption processing method characterized in that the encryption/decryption processing method has an encryption/decryption processing step of carrying out Feistel-type common key block encryption/decryption processing repeating an SP-type F function used in execution of data transform processing including nonlinear and linear transform processes in a plurality of rounds, and the encryption/decryption processing step is executed to carry out at least one of the nonlinear and linear transform processes applying the F function executed in the rounds as a data transform process identical with a data transform process applying an encryption/decryption algorithm other than the algorithm of the Feistel-type common key block encryption/decryption processing or another hash function.

In addition, in accordance with an embodiment implementing the encryption/decryption processing method provided by the invention, the encryption/decryption processing step has a characteristic that executes the processing to selectively apply at least two or more matrixes different from each other to the linear transform process carried out in the rounds, at least one of the selected matrixes being a matrix applied to the encryption/decryption algorithm other than the algorithm of the Feistel-type common key block encryption/decryption processing or the other hash function.

In addition, in accordance with an embodiment implementing the encryption/decryption processing method provided by the invention, the encryption/decryption processing step is characterized in that it is executed to selectively apply two matrixes $M_0$ and $M_1$ different from each other to the linear transform process carried out in the rounds in such a way that the order of application of the two matrixes $M_0$ and $M_1$ different from each other satisfies the following conditions (a) and (b):

(a) $M_0$ is followed by $M_1$ in a sequence of the odd-numbered rounds;

(b) $M_0$ is followed by $M_1$ in a direction starting from the last stage in the sequence of the even-numbered rounds.

In addition, in accordance with an embodiment implementing the encryption/decryption processing method provided by the invention, the encryption/decryption processing step has a characteristic that executes the processing to selectively apply three matrixes $M_0$, $M_1$ and $M_2$ different from each other to the linear transform process carried out in the rounds in such a way that the order of application of the three matrixes $M_0$, $M_1$ and $M_2$ different from each other satisfies the following conditions (a) and (b):

(a) $M_0$ is followed by $M_1$ to be followed by $M_2$ in a sequence of the odd-numbered rounds;

(b) $M_0$ is followed by $M_1$ to be followed by $M_2$ in a direction starting from the last stage in the sequence of the even-numbered rounds.

In addition, in accordance with an embodiment implementing the encryption/decryption processing method provided by the invention, the encryption/decryption processing step has a characteristic that is a step of carrying out 64-bit Feistel-type common key block encryption/decryption processing, at least one of matrixes selected as matrixes to be used in the linear transform process carried out in the rounds being a matrix applied to an AES encryption/decryption algorithm.

In addition, in accordance with an embodiment implementing the encryption/decryption processing method provided by the invention, the encryption/decryption processing step has a characteristic that is a step of carrying out 128-bit Feistel-type common key block encryption/decryption processing; and at least one of matrixes selected as matrixes to be used in the linear transform process carried out in the rounds being a matrix applied to a Whirlpool hash function.

In accordance with a third aspect of the present invention, there is provided a computer program for driving an encryption/decryption processing device to carry out encryption/decryption processing, the computer program is characterized in that has an encryption/decryption processing step of carrying out Feistel-type common key block encryption/decryption processing repeating an SP-type F function used in execution of data transform processing including nonlinear and linear transform processes in a plurality of rounds as a step to be executed by the encryption/decryption processing section, the encryption/decryption processing step being a step of carrying out at least one of the nonlinear and linear transform processes applying the F function executed in the rounds as a transform process identical with a transform process applying an encryption/decryption algorithm other than the algorithm of the Feistel-type common key block encryption/decryption or another hash function.

The computer program provided by the present invention is presentable to a computer system typically capable of executing a variety of program codes through a recording medium or communications medium, a recording medium such as a CD, an FD or an MO, or a computer program downloadable through a communications medium such as a network in a computer-readable format. By presenting or downloading the computer program to the computer system functioning as the encryption/decryption processing device in a computer-readable format, the computer system is capable of executing the computer program in order to carry out the encryption/decryption processing.

These and other objects, features and advantages of the present invention will probably become clear from the following description given with reference to the accompanying diagrams as description of preferred embodiments. It is to be noted that the technical term 'system' used in this specification implies the configuration of a logical confluence including a plurality of devices without regard to whether or not the device are incorporated in the same casing.

Advantageous Effects

In accordance with the configuration of the present invention, in Feistel-type common key block encryption/decryption processing executed by repeating an SP-type F function including nonlinear and linear transform sections in a plurality of rounds, at least one of the nonlinear and linear transform processes applying the F function executed in the rounds is carried out as a transform process identical with a transform process applying an encryption/decryption algorithm other than the algorithm of the Feistel-type common key block encryption/decryption processing or another hash function, for example, an AES or Whirlpool. With such a configuration, a design cost can be reduced and the amount of data stored in a memory can also be decreased due to the use of the common components. That is to say, a hardware implementation cost can be reduced by making at least some hardware or software required for carrying out the nonlinear and linear transforms as hardware or software common in the processes in different kinds of encryption/decryption processing based on different algorithms or different hash functions. In addition, a code size can be reduced by making use of common modules in the implementation of at least some software required for carrying out the processes.

BEST MODE FOR CARRYING OUT THE INVENTION

An encryption/decryption processing device provided by the present invention, an encryption/decryption processing method and a computer program are described in detail by dividing the description into the following topics:

1: Feistel structure having an SP-type F function
2: Optimal diffusion mappings on a linear transform layer (P layer)
3: Modes of data transform applying a variety of encryption/decryption algorithms and hash functions
4: Configuration including a data transform processing configuration applying other encryption/decryption algorithms and other hash functions in a data transform process of Feistel-type encryption/decryption having the SP-type F function.
    (4.1): 64-bit Feistel-type encryption/decryption commonly using components conforming to the AES
    (4.2): 128-bit Feistel-type block encryption/decryption commonly using components conforming to Whirlpool
5: Typical configuration of the encryption/decryption processing device

[1. Feistel Structure Having an SP-Type F Function]

First of all, a Feistel structure having an SP-type F function is explained. As a design of the common key block encryption/decryption, a structure referred to as a Feistel structure is adopted in many cases. The Feistel structure is a structure for placing transform functions each serving as a fundamental in a plain-data transform method in a special order. The Feistel structure has a structure for transforming plain data into an encrypted one by simple repetition of a transform function known as a round function.

Figure 1:
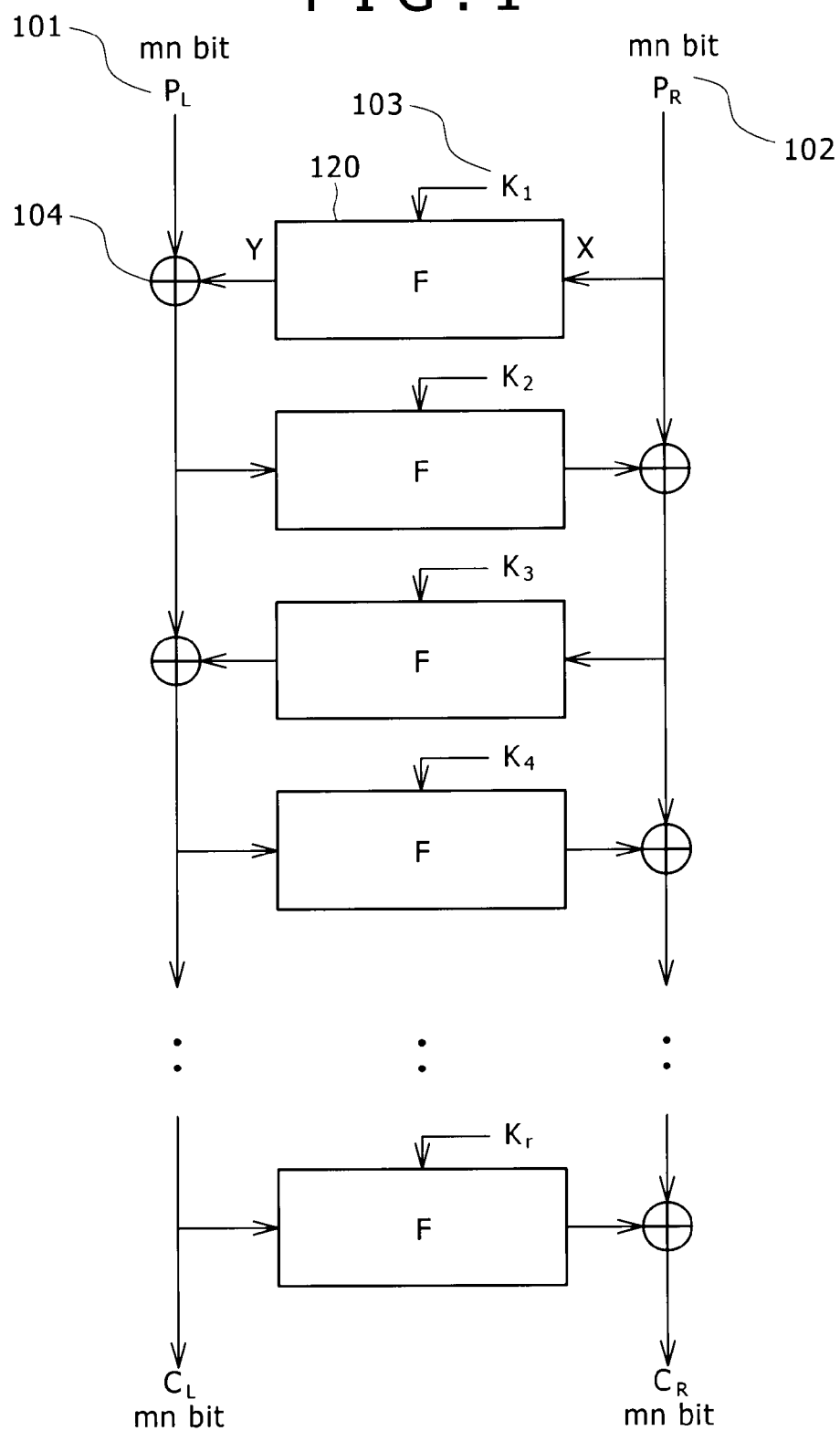
FIG. 1 is a diagram showing the configuration of representative common key block encryption/decryption having a Feistel structure.

The Feistel structure is explained by referring to FIG. 1. Let the length of input plain data serving as a subject of encryption be 2 nm bits where each of notations m and n denotes an integer. First, the plain data having a length of 2 nm bits is divided into two pieces of input data, i.e., input data $P_L$ (Plain-Left) 101 and input data $P_R$ (Plain-Right) 102 which are then each handled as an input.

The Feistel structure is expressed as a repetition of a basic structure referred to as the round function. A data transform function included in every round is referred to as an F function 120. The configuration shown in FIG. 1 is a typical configuration in which the F function (the round function) 120 is repeated at r stages.

In the first round for example, mn-bit input data X and a $K_1$ nm-bit round key 103 supplied from a key generation section not shown in the figure are input to the F function 120 used for carrying out a data transform process at the F function 120 to generate mn-bit data Y. The output and input data (if the other preceding stage is the first stage, the input data is the input data $P_L$) supplied from the other preceding stage are supplied to an exclusive logical-sum section 104 for carrying out an exclusive logical-sum process to output an mn-bit arithmetic result to the next round function. At the end of this encryption/decryption processing to repeat the application of the F function in a predetermined number of rounds (r), partial data $C_L$ (Cipher-Left) of encrypted data obtained as a result of the encryption/decryption and partial data $C_R$ (Cipher-Right) of the encrypted data are output. With the configuration described above, a decryption process of the Feistel structure can be derived by merely reversing the order to insert the round keys without the need to construct an inverse function.

Figure 2:
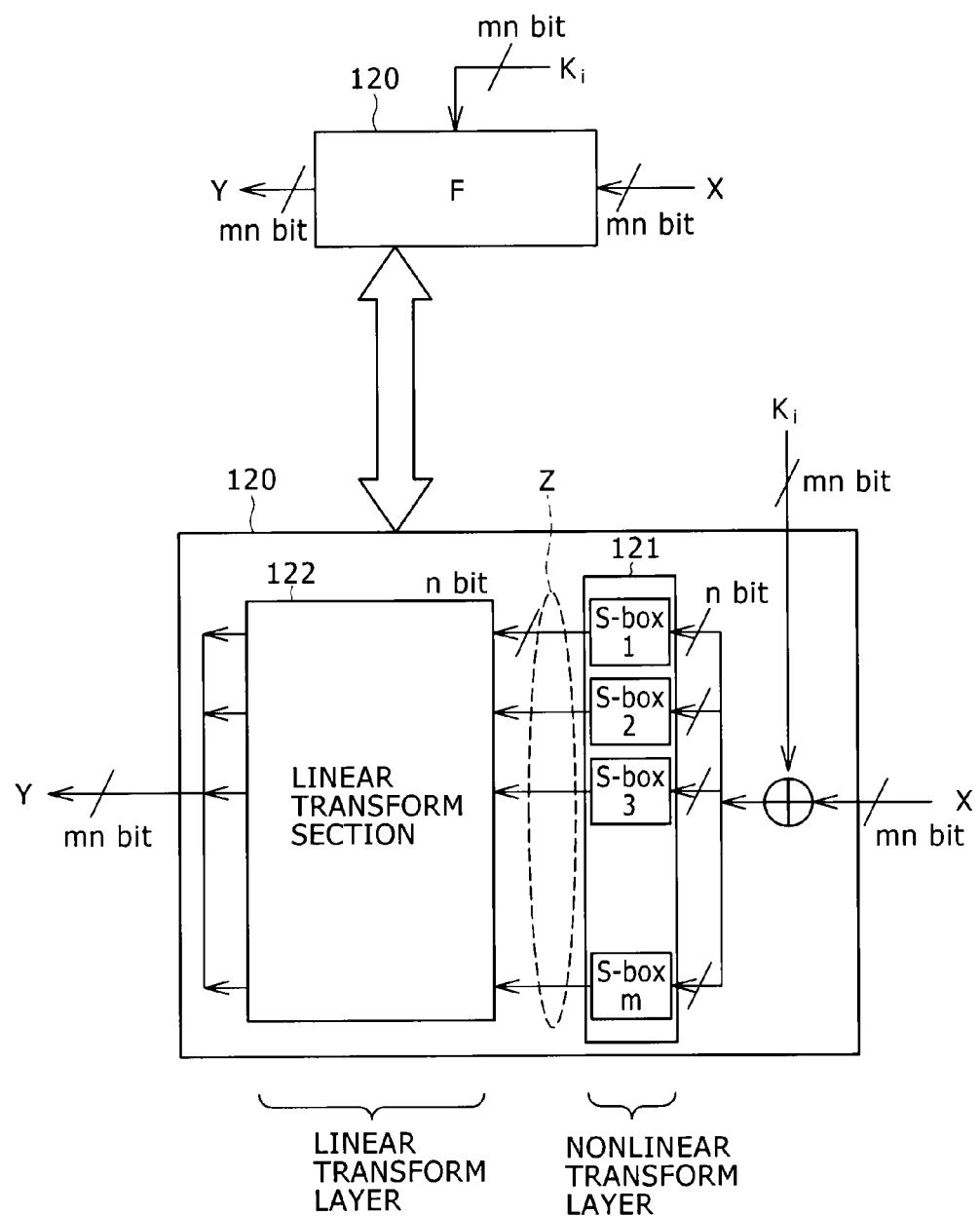
FIG. 2 is an explanatory diagram showing the configuration of an F function set as a round function.

The configuration of the F function 120 set as a function in each round is explained by referring to FIG. 2. FIG. 2 (a) is a diagram showing inputs supplied to the F function 120 in a round and an output generated by the F function 120 whereas FIG. 2 (b) is a diagram showing details of the configuration of the F function 120. As shown in FIG. 2 (b), the F function 120 has the so-called SP-type configuration connecting a nonlinear transform layer (S layer) to a linear transform layer (P layer).

The F function 120 shown in FIG. 2 is a function having set input and output lengths of m×n bits where each of notations m and n denotes an integer. Inside the SP-type F function, first of all, a key $K_i$ and data $X_i$ are subjected to an exclusive logical sum process outputting a result subjected next to the nonlinear transform layer (S layer) generating outputs subjected next to the linear transform layer (P layer).

To put it concretely, the nonlinear transform layer (S layer) is an S-box 121 having m nonlinear transform tables arranged in parallel as tables each receiving an n-bit input and generating an n-bit output. That is to say, the mn-bit data is divided into data each having a length of n bits and the data are supplied to the S-box 121 and transformed. The S box carries out a nonlinear transform process typically by making use of the nonlinear transform tables.

The linear transform layer (P layer) is configured of a linear transform section 122. The linear transform section 122 receives mn-bit output data Z output by the S box 121 and carries out a linear transform on the input data in order to generate an mn-bit output. The linear transform process carried out by the linear transform section 122 includes a process to rearrange the input bit positions in order to generate the mn-bit output value Y. The mn-bit output value Y and input data from the preceding state are subjected to an exclusive logical sum process in order to generate an input value supplied to the F function in the next round.

It is to be noted that, in the configuration of a typical embodiment described below, a linear transform carried out by the linear transform section 122 serving as the linear transform layer (P layer) is defined as a linear transform carried out by making use of an mn×mn matrix defined on the GF (2). In addition, the matrix included in the ith round is referred to as a matrix $M_i$.

[2. Optimal Diffusion Mappings on a Linear Transform Layer (P Layer)]

As a special example of the linear transform carried out by the linear transform section 122 serving as the linear transform layer (P layer) described above, optimal diffusion mappings are defined as follows.

For mapping $\theta: \{0, 1\}^{na} \rightarrow \{0, 1\}^{nb}$ to carry out a linear transform from n×a-bit data to n×b-bit data, a branch count $B(\theta)$ is defined as follows:

$$B(\theta) = \min_{\alpha \neq 0}\{hw_n(\alpha) + hw_n(\theta(\alpha))\}$$

where notation $\min_{\alpha \neq 0} \{X_\alpha\}$ denotes the smallest value among all $X_\alpha$ satisfying a condition of $\alpha \neq 0$ whereas notation $hw_n (Y)$ denotes a function returning the number of non-zero n-bit elements obtained as a result of dividing a bit array Y into elements each having n-bit data. Mapping θ resulting in a branch count $B(\theta)$ equal to (b+1) is defined as the optimal mapping. In addition, for the sake of convenience, notation B (M) is used to denote the branch count of a matrix M.

[3. Modes of Data Transform Processing Applying a Variety of Encryption/Decryption Algorithms and Hash Functions]

Next, modes of data transform processing applying a variety of encryption/decryption algorithms and hash functions are explained. The nonlinear and linear transform processes are data transform processes applying a number of different encryption/decryption algorithms and/or a number of different hash functions each used as a contraction function.

In applying a variety of encryption/decryption algorithms and/or a variety of hash functions, an S-box having nonlinear transform tables each receiving an n-bit input and generating an n-bit output is used as the nonlinear transform layer (S layer) whereas a linear transform matrix for carrying out linear transform processing including a process to rearrange input bit positions is used as the linear transform layer (P layer).

The data transform applying a variety of encryption/decryption algorithms and a variety of hash functions as described above have a common characteristic of carrying out nonlinear transform and linear transform. Thus, in processing of such as the common key block encryption/decryption, some hash functions and a stream encryption/decryption, the same components for carrying out the data transform may be used in some cases. For example, there are cases in which an 8-bit input/output substitution table for implementing a nonlinear transform process is used and a 4×4 or 8×8 matrix defined on the GF ($2^8$) is used for a linear transform. The following description explains an outline of the nonlinear and linear transforms applying an algorithm standardized to conform to the American standard encryption/decryption AES (Advanced Encryption Standard) and a Whirlpool hash function standardized to conform to the ISO.

(1) AES Encryption/Decryption

The American standard encryption/decryption AES is 128-bit block encryption/decryption. In a data transform procedure, the following nonlinear and linear transform processes exist.

[Nonlinear Transform]

$$y_0 = S^{AES}(x_0)$$

$$y_1 = S^{AES}(x_1)$$

$$y_2 = S^{AES}(x_2)$$

$$y_3 = S^{AES}(x_3) \quad \text{[Equations 1]}$$

The above equations represent a part of the nonlinear transform conforming to the AES. Notation $S^{AES}(x_k)$ in the above equation denotes a processing function making use of an S box for carrying out a nonlinear transform applying an AES algorithm. The processing function is a function for carrying out a nonlinear transform process having 1-byte data ($x_k$) as an input and 1-byte data ($y_k$) as an output. In application of a plurality of S boxes, nonlinear transform is carried out to transform four input byte data $x_0$ to $x_3$ into four input byte data $y_0$ to $y_3$ respectively.

[Linear Transform Process]

$$\begin{pmatrix} z_0 \\ z_1 \\ z_2 \\ z_3 \end{pmatrix} = \begin{pmatrix} 2 & 3 & 1 & 1 \\ 1 & 2 & 3 & 1 \\ 1 & 1 & 2 & 3 \\ 3 & 1 & 1 & 2 \end{pmatrix} \begin{pmatrix} y_0 \\ y_1 \\ y_2 \\ y_3 \end{pmatrix} \quad \text{[Equations 2]}$$

The above equation represents a part of the linear transform conforming to the AES. The above equation is an equation based on a linear transform matrix used for carrying out linear transform processing including a process to rearrange input bit positions. Every element of each of the matrixes is an element on the finite body GF ($2^{**}8$) whereas its irreducible polynomial is expressed by an expression of $t^8+t^4+t^3+t+1$. The matrix used for carrying out the linear transform processing is a matrix for optimal diffusion mappings each having a branch count of 5. The linear transform adopting an AES encryption/decryption algorithm makes use of the 4×4 matrix shown above.

(2) Whirlpool

The following description explains outlines of the nonlinear and linear transforms making use of the Whirlpool hash function standardized to conform to the ISO. The Whirlpool hash function is a hash function having an output of 512 bits, which has data transform procedure including a portion for carrying out processing described as follows.

[Nonlinear Transform Process]

$y_0 = S^w(x_0)$ $y_1 = S^w(x_1)$ $y_2 = S^w(x_2)$ $y_3 = S^w(x_3)$ $y_4 = S^w(x_4)$ $y_5 = S^w(x_5)$ $y_6 = S^w(x_6)$ $y_7 = S^w(x_7)$ [Equations 3]

The above equations express a nonlinear transform making use of the Whirlpool hash function. Notation $S^w(x_k)$ used in the above equations denotes a processing function in an S-box for carrying out a nonlinear transform process making use of the Whirlpool hash function. The processing function receives data ($x_k$) having a length of 1 byte as an input and outputs data ($y_k$) also having a length of 1 byte as an output. By making use of a plurality of S-boxes, eight input byte data $x_0$ to $x_7$ are nonlinearly transformed into respectively eight input byte data $y_0$ to $y_7$.

[Linear Transform]

$$\begin{pmatrix} z_0 \\ z_1 \\ z_2 \\ z_3 \\ z_4 \\ z_5 \\ z_6 \\ z_7 \end{pmatrix} = \begin{pmatrix} 1 & 9 & 2 & 5 & 8 & 1 & 4 & 1 \\ 1 & 1 & 9 & 2 & 5 & 8 & 1 & 4 \\ 4 & 1 & 1 & 9 & 2 & 5 & 8 & 1 \\ 1 & 4 & 1 & 1 & 9 & 2 & 5 & 8 \\ 8 & 1 & 4 & 1 & 1 & 9 & 2 & 5 \\ 5 & 8 & 1 & 4 & 1 & 1 & 9 & 2 \\ 2 & 5 & 8 & 1 & 4 & 1 & 1 & 9 \\ 9 & 2 & 5 & 8 & 1 & 4 & 1 & 1 \end{pmatrix} \begin{pmatrix} y_0 \\ y_1 \\ y_2 \\ y_3 \\ y_4 \\ y_5 \\ y_6 \\ y_7 \end{pmatrix}$$ [Equations 4]

The above equations express a linear transform making use of the Whirlpool hash function. The above equations make use of a linear transform matrix used for carrying out linear transform processing including a process to rearrange input bit positions. Every element of each of the matrixes is an element on the finite body GF ($2^8$) whereas its irreducible polynomial is expressed by an expression of $t^8+t^4+t^3+t+1$. The matrix used here is a matrix for optimal diffusion mappings each having a branch count of 9. The linear transform adopting the algorithm of the Whirlpool hash function makes use of the 8×8 matrix shown above.

[4. Configuration Including a Data Transform Processing Configuration Applying Other Encryption/Decryption Algorithms and Other Hash Functions in a Data Transform Process of Feistel-Type Encryption/Decryption Having the SP-Type F Function]

As described above, in the case of both the processing based on the AES encryption/decryption and the processing based on the Whirlpool hash function, in the data transform processing to transform input values into output values, nonlinear and linear transforms are carried out. The data prescribed in advance is used for each data to be used in the nonlinear and linear transforms, that is to say, a transform table (or a substitution table) to be used in the nonlinear transform process and a linear transform matrix to be used in the linear transform.

The following description explains the configurations of a transform table (substitution table) used in nonlinear transform and a linear transform matrix used in linear transform, each based on the AES encryption/decryption and the Whirlpool hash function as a nonlinear transform process or transform process carried out in data transform process carried out in the Feistel-type encryption/decryption having an SP-type F function.

an encryption/decryption processing device provided by the present invention employs an encryption/decryption processing section for carrying out Feistel-type common key block encryption/decryption processing repeating an SP-type F function used in execution of data transform processing including nonlinear and linear transform processes in a plurality of rounds. The encryption/decryption processing section is configured to carry out at least one of the nonlinear and linear transform processes applying the F function executed the rounds as a transform process identical with a transform process applying an encryption/decryption algorithm other than the algorithm of the Feistel-type common key block encryption/decryption or hash function.

The Feistel-type encryption/decryption having an SP-type F function has been explained in the chapter having a title of "1. Feistel structure having an SP-type F function." Its algorithm is different from the AES encryption/decryption and the algorithm of the Whirlpool hash function. As explained earlier by referring to FIGS. 1 and 2, the Feistel-type encryption/decryption having an SP-type F function has a configuration in which an F function is executed in a plurality of rounds. In the configuration, the transform processing carried out by executing the F function in a plurality of rounds includes a nonlinear transform process applying an S box and a linear transform process making use of a linear transform matrix.

The Feistel-type encryption/decryption having the SP-type F function is one of designs of the common key block encryption/decryption. By changing the configuration of the F function, the Feistel-type encryption/decryption having the SP-type F function can be adapted for a variety of configurations of the input/output bits. The examples of that are 64-bit block encryption/decryption adapted for the 64 input/output bits, and 128-bit block encryption/decryption adapted for the 128 input/output bits.

In a process of designing the Feistel-type encryption/decryption having the SP-type F function, each of the nonlinear and linear transform processes needs to be configured to match the number of processed bits.

Here, for example, in the Feistel-type encryption/decryption having the SP-type F function for carrying out a 64-bit block encryption/decryption with an input and an output each having a length of 64 bits, it is possible to configure nonlinear and linear transform processes adopting the AES encryption/decryption algorithm described above. That is to say, it is possible to make use of a transform table (substitution table) in the nonlinear transform process adopting the AES algorithm and make use a linear transform matrix in the linear transform process adopting the AES algorithm.

In the Feistel-type encryption/decryption having the SP-type F function for carrying out a 128-bit block encryption/decryption with an input and an output each having a length of 128 bits, it is possible to configure nonlinear and linear transforms adopting the Whirlpool hash function. That is to say, it is possible to make use of a transform table (substitution table) in the nonlinear transform adopting the Whirlpool hash function and make use a linear transform matrix in the linear transform adopting the Whirlpool hash function.

In the Feistel-type encryption/decryption having the SP-type F function, if a linear transform matrix is set as a matrix varying from round to round, for example, it is possible to increase a resistance to an attack such as an attack on a differential analysis. That is to say, the encryption/decryption strength can be enhanced. It is to be noted that details of a configuration for enhancing the encryption/decryption strength of the Feistel-type encryption/decryption having the SP-type F function by setting a linear transform matrix as a matrix varying from round to round are described in Japanese Patent Laid-open No. 2005-313842 filed earlier by the same inventors as the present invention.

The conventional Feistel-type encryption/decryption used the same linear transform layer for the F functions at all stages, whereby had a property of cancelling a plurality of differentials at the same time as propagations of the differentials. As a representative technique of encryption/decryption analyses, differential analysis (or differential cryptanalysis) in which a plurality of input data (plain texts) having differentials and a plurality of output data (encrypted texts) of the input data are analyzed in order to carry out a differential analysis for analyzing keys each used in a round function have known. In the common key block encryption/decryption based on typically the conventional DES encryption/decryption algorithm, the same processing (the same transform matrix) for a linear transform section carrying out the processing by making use of an F function is set for rounds at all stages. Thus, the differential analysis can be carried out with ease. As a result, the easiness of the key analysis is brought about to the user.

If a linear transform matrix for the F function is set as a matrix varied in accordance with a special sequence, it is possible to eliminate the property of cancelling a plurality of differentials at the same time as propagations of the differentials. As a result, it is possible to increase a resistance to an attack such as an attack on a differential analysis.

If a linear transform matrix is set as a matrix varied from round to round, the information processing device such as an IC card for typically carrying out an encryption/decryption processing needs to hold the linear transform matrixes different from each other. In a process to select one of a plurality of matrixes, there are some selection criteria. For example, in a process to determine each matrix, two or three new matrixes are not all determined automatically. Instead, one of them is used as it is as a matrix adopting the AES or the Whirlpool. In this way, the design efficiency can be improved.

To put it concretely, in the configuration, one of the matrixes used in the 64-bit Feistel-type block encryption/decryption processing is a matrix conforming to the AES and one of the matrixes used in the 128-bit Feistel-type encryption/decryption processing is a matrix conforming to the Whirlpool.

As described earlier, in the case of an IC card or a hand-held terminal, various kinds of data processing can be carried out in a single unit. In consequence, there is demanded a configuration capable of implementing a variety of encryption/decryption algorithms and a variety of hash functions. In response to such a demand, there are provided two different algorithms, i.e., the AES and the Feistel-type encryption/decryption. In order to implement a configuration capable of implementing the two different algorithms, it is necessary to store nonlinear transform tables conforming to the algorithms and linear transform matrixes also conforming to the algorithms. In response to such a demand, there may be provided two different algorithms, i.e., the Whirpool and the Feistel-type encryption/decryption. In order to implement a configuration capable of implementing these two different algorithms, it is necessary to store nonlinear transform tables conforming to the algorithms and linear transform matrixes also conforming to the algorithms.

To hold the data to be transformed for the plurality of algorithms, the limited memory space of a device such as an IC card is consumed up for storing a plurality of tables and matrixes used for the plurality of algorithm. In addition, for example, the liner transform matrix conforming to the Feistel-type encryption/decryption is unfavorable to use arbitrary matrix in order to sustain an encryption/decryption strength determined in advance. This matrix is necessary to be the matrix having the characteristics that does not reduce the encryption/decryption strength.

For example, constraints on the linear transform matrix conforming to the Feistel-type encryption/decryption are described in a document such as Japanese Patent laid-open No. 2005-313842 aforementioneed earlier by the same inventors as the present invention. As an example, a conformable typical constraint is described as follows.

(Constraint Condition A)

A linear transform section executing the an F function at each of r stages in the Feistel-type common key block encryption/decryption processing configuration making used of the F function at the r stages applies a matrix $M_i$ which satisfies the following condition:

A branch count $B(\theta)$ for a mapping operation of $\theta: \{0, 1\}^{na} \rightarrow \{0, 1\}^{nb}$ implementing a linear transform to transform data of n×a bits into data of n×b bits shall satisfy the following equation:

$$\text{Branch count } B(\theta) = \min_{\alpha \neq 0}\{hw_n(\alpha) + hw_n(\theta(\alpha))\},$$

where notation $\min_{\alpha \neq 0} \{X_\alpha\}$ denotes the smallest value among all $X_\alpha$ satisfying a condition of $\alpha \neq 0$ whereas notation $hw_n(Y)$ denotes a function returning the number of non-zero n-bit elements obtained as a result of dividing a bit array Y into elements each having n-bit data. Mapping $\theta$ resulting in a branch count $B(\theta)$ equal to b+1 is defined as the optimal diffusion mapping. In addition, notation B(M) is used to denote the branch count of a matrix M; Let notations $BD_1$ and $BD_2$ denote branch counts defined as follows:

$$BD_1 = \min\{B(M_i) | 1 \leq i \leq r\}$$

$$BD_2 = \min\{B(M_i | M_{i+2}) | 1 \leq i \leq (r-2)\}$$

where notation A|B denotes a matrix obtained as a result of concatenation of matrixes A and B.

In this case, matrixes $M_i$ providing all the branch counts $BD_1$ and $BD_2$ at least equal to 3 are used. It is to be noted that the condition requiring of at least equal to 3 implies that matrixes $M_i$ and $M_{i+2}$ must always be matrixes different from each other.

For example, constraint condition A described above can be applied as a condition for a linear transform matrix used in a Feistel-type encryption/decryption in order to exhibit a resistance to an attack such as an attack on a differential attack.

A liner transform matrix used in such as the AES and Whirlpool has the branch count which is one of indicators of a sustained encryption/decryption strength and satisfies a condition determined in advance. By making use of such a linear transform matrix in Feistel-type encryption/decryption, the sustainment of an encryption/decryption strength can be assured. Thus, by applying linear transform matrixes used in the AES and the Whirlpool as some of a plurality of matrixes in a Feistel-type encryption/decryption making use of above described a plurality of linear transform matrixes different from each other, the memory of an encryption/decryption processing device such as an IC card or a hand-held terminal can be utilized effectively and, in addition, the Feistel-type encryption/decryption can be designed with a high degree of efficiency. That is to say, the number of linear transform matrixes to be determined at the designed stage can be reduced, and, since the number of candidates which the designer should look for can be decreased, the time for narrowing down can be eliminated.

Hereinafter, the description explains a typical configuration for setting linear transform matrixes to be used in rounds of a Feistel-type encryption/decryption having an SP-type F function as matrixes different from each other and for applying the AES or the Whirlpool to some of the linear transform matrixes in a Feistel-type encryption/decryption which has an increased resistance to an attack such as an attack on a differential analysis. To be more specific, the following description explains an embodiment making use of one of two or three different linear transform matrixes used in the Feistel encryption/decryption as a matrix to which the AES or the Whirlpool is applied.

(4.1): 64-Bit Feistel-Type Encryption/Decryption Commonly Using Components Conforming to the AES First of all, the configuration of a 64-bit block encryption/decryption making commonly use of components with the AES is explained. As described earlier, by making use of a linear conversion matrix in the F function carried out in rounds of the Feistel-type encryption/decryption, it is possible to eliminate the property of cancelling a plurality of differentials at the same time as propagations of the differentials, whereby it is possible to increase a resistance to an attack such as an attack on a differential analysis. Hereinafter, the description will explain a typical configurations in which two linear transform matrixes different from each other and three linear transform matrixes different from each other are each applied to an SP-type 64-bit Feistel-type encryption/decryption making use of an F function on a nonlinear transform layer (S layer) and a linear transform layer (P layer), some of the liner transform matrixes conforming to the AES encryption/decryption algorithm.

(4.1.1): Typical Configuration Applying Two Different Linear Transform Matrixes

First of all, the following description explains a typical configuration in which two linear transform matrixes different from each other are applied to an executed 64-bit block encryption/decryption. The description begins with an explanation of a Feistel-type encryption/decryption algorithm making use of two linear transform matrixes different from each other as an explanation given with reference to FIG. 3.

Figure 3:
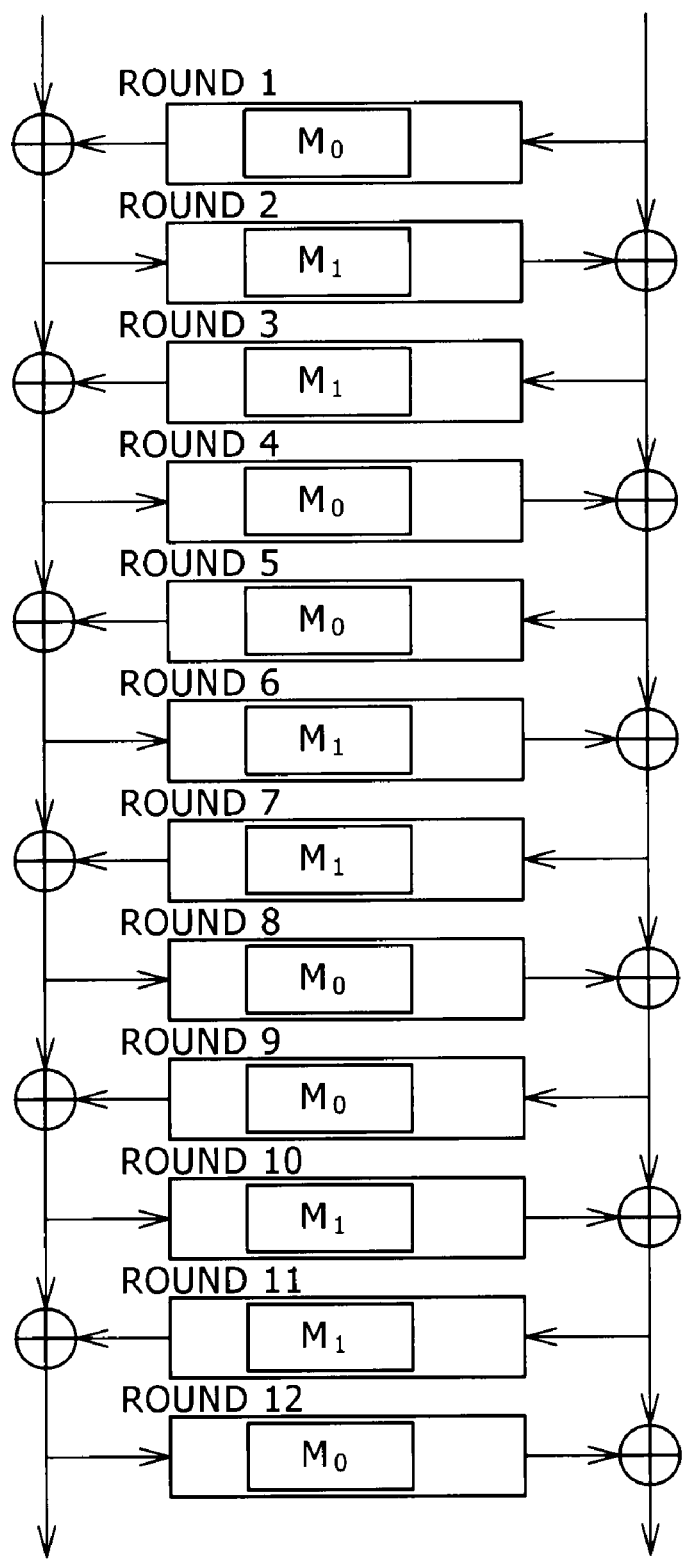
FIG. 3 is an explanatory diagram to be referred to in description of a Feistel-type encryption/decryption algorithm making use of two different linear transform matrixes from each other.

In accordance with the configuration of the algorithm, the two different linear transform matrixes $M_0$ and $M_1$ are used as matrixes for the liner transform processing executed in the liner transform section in the F function at each stage in the configuration of the Feistel-type common key block encryption/decryption processing having a plurality of stages (rounds). To put it concretely, as shown in FIG. 3, the two matrixes $M_0$ and $M_1$ are arranged into a configuration which satisfies the following conditions (a) and (b):

(a) $M_0$ is followed by $M_1$ in a sequence of the odd-numbered rounds;

(b) $M_0$ is followed by $M_1$ in a direction starting from the last stage in the sequence of the even-numbered rounds.

As described above, condition (a) requires that the matrix $M_0$ be followed by the matrix $M_1$ in a sequence of aforementioned odd-numbered rounds. As shown in FIG. 3, the matrix $M_0$ is followed by the matrix $M_1$ in a sequence of the odd-numbered rounds 1, 3, 5 and so on. The condition (b) requires that $M_0$ be followed by $M_1$ in a direction starting from the last stage in the sequence of the even-numbered rounds. As shown in FIG. 3, the matrix $M_0$ is followed by the matrix $M_1$ in a sequence of the rounds 12, 10, 8 and so on.

Here, each of the matrixes $M_0$ and $M_1$ is a liner transform matrix or 4×4 matrix used in an F function carried out in each of the rounds. The two matrixes $M_0$ and $M_1$ are different from each other. One of the matrixes (that is, the matrix $M_0$ for example) is a 4×4 matrix conforming to the AES algorithm described above. The matrix $M_1$ is a matrix satisfying the constraint condition of the Feistel encryption/decryption algorithm.

A concrete typical combination of matrixes is described as follows. For example, there is a combination of two typical matrixes $M_0$ and $M_1$ given below. The typical matrixes $M_0$ and $M_1$ satisfy a condition that, even if any four rows of the entire two matrixes $M_0$ and $M_1$ are extracted, the number of branches is five and, even if any four rows of the entire two matrixes ${'M_0}^{-1}$ and ${'M_1}^{-1}$ are extracted, the number of branches is five. In this case, notation $'M$ denotes a transposed matrix whereas notation $M^{-1}$ denotes an inverse matrix.

$$M_0 = \begin{pmatrix} 2 & 3 & 1 & 1 \\ 1 & 2 & 3 & 1 \\ 1 & 1 & 2 & 3 \\ 3 & 1 & 1 & 2 \end{pmatrix}$$ [Equations 5]

$$M_1 = \begin{pmatrix} 1 & 6 & 8 & 4 \\ 4 & 1 & 6 & 8 \\ 8 & 4 & 1 & 6 \\ 6 & 8 & 4 & 1 \end{pmatrix}$$

The matrix $M_0$ from the above described matrixes $M_0$ and $M_1$ is a 4×4 used in the AES algorithm described earlier; the matrix $M_1$ is a matrix selected from matrixes satisfying the constraint condition of the Feistel encryption/decryption algorithm. Linear transform making use of an F function based on the two matrixes $M_0$ and $M_1$ different from each other is carried out in rounds in accordance with the Feistel encryption/decryption algorithm. It is to be noted that every element of each of the matrixes represents an element on the finite body GF ($2^8$) whereas its irreducible polynomial is expressed by an expression of $t^8+t^4+t^3+t+1$.

(4.1.2): Typical Configuration Applying Three Different Linear Transform Matrixes Next, a typical configuration of a Feistel-type encryption/decryption using three linear transform matrixes different from each other, which executes 64-bit block encryption/decryption, will be described. The description begins with an explanation of a Feistel-type encryption/decryption algorithm making use of three linear transform matrixes different from each other as an explanation given with reference to FIG. 4.

Figure 4:
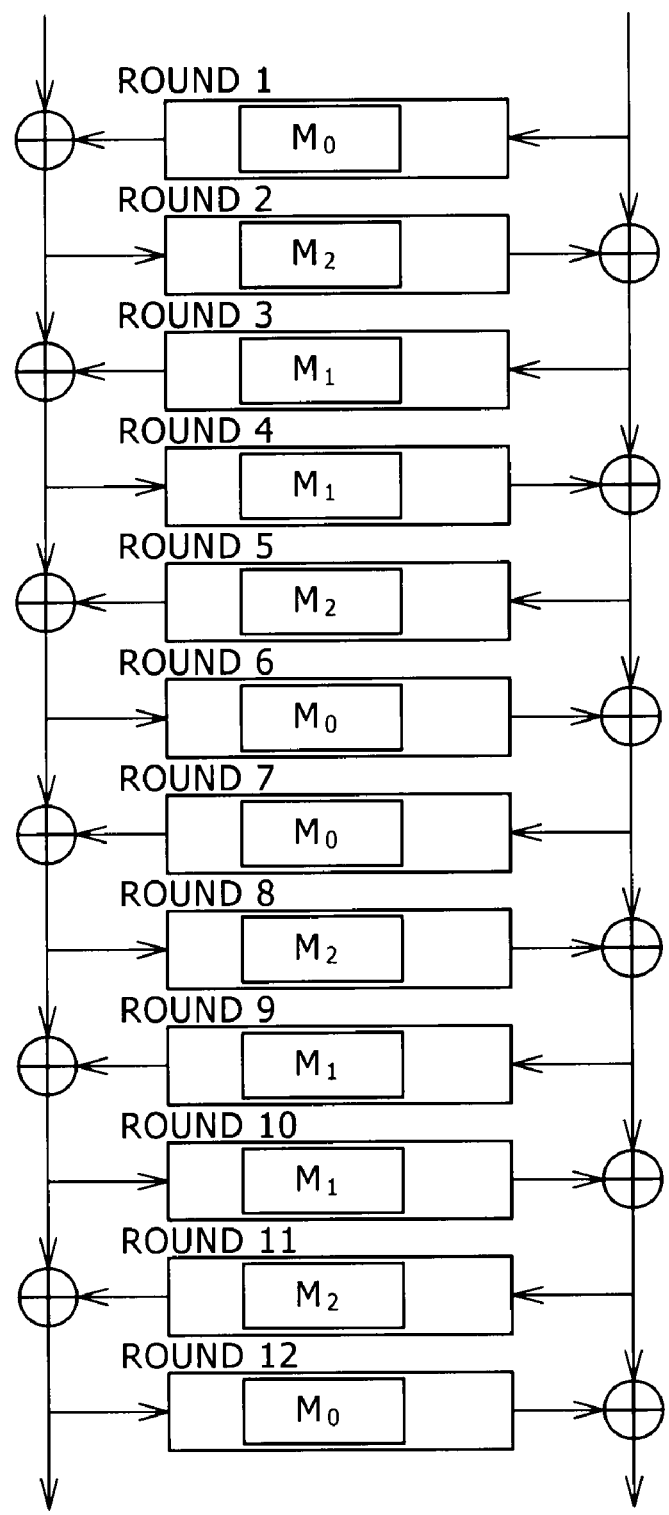
FIG. 4 is an explanatory diagram to be referred to in description of a Feistel-type encryption/decryption algorithm making use of three matrixes different from each other.

In accordance with the configuration of the algorithm, the three different matrixes $M_0$, $M_1$ and $M_2$ are used as matrixes for the liner transform processing executed in the liner transform section in the F function at each stage in the configuration of the Feistel-type common key block encryption/decryption processing having a plurality of stages (rounds). To put it concretely, as shown in FIG. 4, the three different matrixes $M_0$, $M_1$ and $M_2$ are arranged into a configuration which satisfies the following conditions (a) and (b):

(a) $M_0$ is followed by $M_1$ to be followed by $M_2$ in a sequence of the odd-numbered rounds;

(b) $M_0$ is followed by $M_1$ to be followed by $M_2$ in a direction starting from the last stage in the sequence of the even-numbered rounds.

The condition (a) requires that $M_0$ be followed by $M_1$ to be followed by $M_2$ in a sequence of the odd-numbered rounds. As shown in FIG. 4, the matrix $M_0$ is followed by the matrix $M_1$ followed by the matrix $M_2$ in a sequence of the rounds 1, 3, 5 and so on. On the other hand, condition (b) requires that $M_0$ be followed by $M_1$ to be followed by $M_2$ in a direction starting from the last stage in the sequence of the even-numbered rounds. As shown in FIG. 4, the matrix $M_0$ is followed by the matrix $M_1$ followed by the matrix $M_2$ in a sequence of the rounds 12, 10, 8 and so on.

Here, each of the matrixes $M_0$, $M_1$ and $M_2$ is a liner transform matrix or 4×4 matrix used in an F function carried out in each of the rounds. The three matrixes $M_0$, $M_1$ and $M_2$ are different from each other. One of the matrixes (that is, the matrix $M_0$ for example) is a 4×4 matrix conforming to the AES algorithm described above. The matrixes $M_1$ and $M_2$ are matrixes satisfying the constraint condition of the Feistel encryption/decryption algorithm.

A concrete typical combination of matrixes is described as follows. For example, there is a combination of three typical matrixes $M_0$, $M_1$ and $M_2$ given below. The matrixes satisfy a condition that, even if any four rows of the entire three matrixes $M_0$, $M_1$ and $M_2$ are extracted, the number of branches is five and, even if any four rows of the entire two matrixes ${}^tM_0^{-1}$ and ${}^tM_1^{-1}$, ${}^tM_1^{-1}$ and ${}^tM_2^{-1}$ or ${}^tM_2^{-1}$ and ${}^tM_0^{-1}$ are extracted, the number of branches is five.

$$M_0 = \begin{pmatrix} 2 & 3 & 1 & 1 \\ 1 & 2 & 3 & 1 \\ 1 & 1 & 2 & 3 \\ 3 & 1 & 1 & 2 \end{pmatrix} \quad M_1 = \begin{pmatrix} 1 & 6 & 8 & 4 \\ 4 & 1 & 6 & 8 \\ 8 & 4 & 1 & 6 \\ 6 & 8 & 4 & 1 \end{pmatrix}$$

$$M_2 = \begin{pmatrix} 1 & 9 & 4 & a \\ a & 1 & 9 & 4 \\ 4 & a & 1 & 9 \\ 9 & 4 & a & 1 \end{pmatrix}$$

[Equations 6]

The matrix $M_0$ from the above described matrixes $M_0$, $M_1$ and $M_2$ is a 4×4 used in the AES algorithm described earlier; the matrixes $M_1$ and $M_2$ are matrixes selected from matrixes satisfying the constraint condition of the Feistel encryption/decryption algorithm. Linear transform making use of an F function based on the three matrixes $M_0$, $M_1$ and $M_2$ different from each other is carried out in rounds in accordance with the Feistel encryption/decryption algorithm. It is to be noted that every element of each of the matrixes represents an element on the finite body GF ($2^8$) whereas its irreducible polynomial is expressed by an expression of $t^8+t^4+t^3+t+1$.

(4.2): 128-Bit Feistel-Type Block Encryption/Decryption Commonly Processing Using Components Conforming to Whirlpool Next, the configuration of a 128-bit block encryption/decryption commonly making use of components according to the Whirlpool hash function conforming to the ISO standards algorithm is explained. As described earlier, by making use of a linear transform matrix in the F function carried out in rounds of the Feistel-type encryption/decryption, it is possible to eliminate the property of cancelling a plurality of differentials at the same time as propagations of the differentials. As a result, it is possible to increase a resistance to an attack such as an attack on a differential analysis. Hereinafter, the description will explain a typical configurations in which two linear transform matrixes different from each other and three linear transform matrixes different from each other are each applied to an SP-type 128-bit Feistel-type encryption/decryption making use of an F function on a nonlinear transform layer (S layer) and a linear transform layer (P layer), some of the liner transform matrixes conforming to the Whirlpool encryption/decryption algorithm.

(4.2.1): Typical Configuration Applying Two Different Linear Transform Matrixes

First of all, the following description explains a typical configuration in which two linear transform matrixes different from each other are applied to an executed 128-bit block encryption/decryption. The description begins with an explanation of a Feistel-type encryption/decryption making use of two linear transform matrixes different from each other as an explanation given with reference to FIG. 3. In accordance with the configuration of the Feistel-type block encryption/decryption algorithm, the two different linear transform matrixes $M_0$ and $M_1$ are used as matrixes for the liner transform processing executed in the liner transform section in the F function at each stage in the configuration of the Feistel-type common key block encryption/decryption processing having a plurality of stages (rounds). To put it concretely, as shown in FIG. 3, the two matrixes $M_0$ and $M_1$ are arranged into a configuration which satisfies the following conditions (a) and (b):

(a) $M_0$ is followed by $M_1$ in a sequence of the odd-numbered rounds;

(b) $M_0$ is followed by $M_1$ in a direction starting from the last stage in the sequence of the even-numbered rounds.

As described above, condition (a) requires that the matrix $M_0$ be followed by the matrix $M_1$ in a sequence of the odd-numbered rounds. As shown in FIG. 3, the matrix $M_0$ is followed by the matrix $M_1$ in a sequence of the odd-numbered rounds 1, 3, 5 and so on. The condition (b) requires that $M_0$ be followed by $M_1$ in a direction starting from the last stage in the sequence of the even-numbered rounds. As shown in FIG. 3, the matrix $M_0$ is followed by the matrix $M_1$ in a sequence of the rounds 12, 10, 8 and so on.

Here, each of the matrixes $M_0$ and $M_1$ is a liner transform matrix or 8×8 matrix used in an F function carried out in each of the rounds. The two matrixes $M_0$ and $M_1$ are different from each other. One of the matrixes (that is, the matrix $M_0$ for example) is an 8×8 matrix conforming to the Whirlpool algorithm described above. The matrix $M_1$ is a matrix satisfying the constraint condition of the Feistel encryption/decryption algorithm.

A concrete typical combination of matrixes is described as follows. For example, there is a combination of two typical matrixes $M_0$ and $M_1$ given below. The matrixes satisfy a condition that, even if any eight rows of the entire two matrixes $M_0$ and $M_1$ are extracted, the number of branches is at least equal to eight and, even if any eight rows of the entire two matrixes ${}^tM_0^{-1}$ and ${}^tM_1^{-1}$ are extracted, the number of branches is at least equal to eight.

$$M_0 = \begin{pmatrix} 1 & 9 & 2 & 5 & 8 & 1 & 4 & 1 \\ 1 & 1 & 9 & 2 & 5 & 8 & 1 & 4 \\ 4 & 1 & 1 & 9 & 2 & 5 & 8 & 1 \\ 1 & 4 & 1 & 1 & 9 & 2 & 5 & 8 \\ 8 & 1 & 4 & 1 & 1 & 9 & 2 & 5 \\ 5 & 8 & 1 & 4 & 1 & 1 & 9 & 2 \\ 2 & 5 & 8 & 1 & 4 & 1 & 1 & 9 \\ 9 & 2 & 5 & 8 & 1 & 4 & 1 & 1 \end{pmatrix}$$ [Equations 7]

$$M_1 = \begin{pmatrix} 1 & 6 & 8 & 9 & 6 & 9 & 5 & 1 \\ 1 & 1 & 6 & 8 & 9 & 6 & 9 & 5 \\ 5 & 1 & 1 & 6 & 8 & 9 & 6 & 9 \\ 9 & 5 & 1 & 1 & 6 & 8 & 9 & 6 \\ 6 & 9 & 5 & 1 & 1 & 6 & 8 & 9 \\ 9 & 6 & 9 & 5 & 1 & 1 & 6 & 8 \\ 8 & 9 & 6 & 9 & 5 & 1 & 1 & 6 \\ 6 & 8 & 9 & 6 & 9 & 5 & 1 & 1 \end{pmatrix}$$

The matrix $M_0$ from the above described matrixes $M_0$ and $M_1$ is an 8×8 matrix used in the Whirlpool algorithm described earlier; the matrix $M_1$ is a matrix selected from matrixes satisfying the constraint condition of the Feistel encryption/decryption algorithm. Linear transform making use of an F function based on the two matrixes $M_0$ and $M_1$ different from each other is carried out in rounds in accordance with the Feistel encryption/decryption algorithm. It is to be noted that every element of each of the matrixes represents an element on the finite body GF ($2^8$) whereas its irreducible polynomial is expressed by an expression of $t^8+t^4+t^3+t^2+1$.

(4.2.2): Typical Configuration Applying Three Different Linear Transform Matrixes Next, the following description explains a typical configuration in which three linear transform matrixes different from each other are applied to an executed 128-bit block encryption/decryption. The description begins with an explanation of a Feistel-type encryption/decryption making use of three linear transform matrixes different from each other as an explanation given with reference to FIG. 4. In accordance with the configuration of the Feistel-type block encryption/decryption algorithm, the three different linear transform matrixes $M_0$, $M_1$ and $M_2$ are used as matrixes for the liner transform processing executed in the liner transform section in the F function at each stage in the configuration of the Feistel-type common key block encryption/decryption processing having a plurality of stages (rounds). To put it concretely, as shown in FIG. 4, the three matrixes $M_0$, $M_1$ and $M_2$ are arranged into a configuration which satisfies the following conditions (a) and (b):

(a) $M_0$ is followed by $M_1$ to be followed by $M_2$ in a sequence of the odd-numbered rounds;

(b) $M_0$ is followed by $M_1$ to be followed by $M_2$ in a direction starting from the last stage in the sequence of the even-numbered rounds.

As described above, condition (a) requires that the matrix $M_0$ be followed by the matrix $M_1$ to be followed by the matrix $M_2$ in a sequence of the odd-numbered rounds. As shown in FIG. 4, the matrix $M_0$ is followed by the matrix $M_1$ followed by the matrix $M_2$ in a sequence of the odd-numbered rounds 1, 3, 5 and so on. The condition (b) requires that $M_0$ be followed by $M_1$ to be followed by $M_2$ in a direction starting from the last stage in the sequence of the even-numbered rounds. As shown in FIG. 4, the matrix $M_0$ is followed by the matrix $M_1$ followed by the matrix $M_2$ in a sequence of the rounds 12, 10, 8 and so on.

Here, each of the matrixes $M_0$, $M_1$ and $M_2$ is a liner transform matrix or 8×8 matrix used in an F function carried out in each of the rounds. The three matrixes $M_0$, $M_1$ and $M_2$ are different from each other. One of the matrixes (that is, the matrix $M_0$ for example) is an 8×8 matrix conforming to the Whirlpool algorithm described above. The matrixes $M_1$ and $M_2$ are matrixes satisfying the constraint condition of the Feistel encryption/decryption algorithm.

A concrete typical combination of matrixes is described as follows. For example, there is a combination of three typical matrixes $M_0$, $M_1$ and $M_2$ given below. The matrixes satisfy a condition that, even if any eight rows of the entire three matrixes $M_0$, $M_1$ and $M_2$ are extracted, the number of branches is eight or more and, even if any eight rows of the entire two matrixes ${}^tM_0^{-1}$ and ${}^tM_1^{-1}$, ${}^tM_1^{-1}$ and ${}^tM_2^{-1}$ or ${}^tM_2^{-1}$ and ${}^tM_0^{-1}$ are extracted, the number of branches is eight or more.

$$M_0 = \begin{pmatrix} 1 & 9 & 2 & 5 & 8 & 1 & 4 & 1 \\ 1 & 1 & 9 & 2 & 5 & 8 & 1 & 4 \\ 4 & 1 & 1 & 9 & 2 & 5 & 8 & 1 \\ 1 & 4 & 1 & 1 & 9 & 2 & 5 & 8 \\ 8 & 1 & 4 & 1 & 1 & 9 & 2 & 5 \\ 5 & 8 & 1 & 4 & 1 & 1 & 9 & 2 \\ 2 & 5 & 8 & 1 & 4 & 1 & 1 & 9 \\ 9 & 2 & 5 & 8 & 1 & 4 & 1 & 1 \end{pmatrix}$$ [Equations 8]

$$M_1 = \begin{pmatrix} 1 & 6 & 8 & 9 & 6 & 9 & 5 & 1 \\ 1 & 1 & 6 & 8 & 9 & 6 & 9 & 5 \\ 5 & 1 & 1 & 6 & 8 & 9 & 6 & 9 \\ 9 & 5 & 1 & 1 & 6 & 8 & 9 & 6 \\ 6 & 9 & 5 & 1 & 1 & 6 & 8 & 9 \\ 9 & 6 & 9 & 5 & 1 & 1 & 6 & 8 \\ 8 & 9 & 6 & 9 & 5 & 1 & 1 & 6 \\ 6 & 8 & 9 & 6 & 9 & 5 & 1 & 1 \end{pmatrix}$$

$$M_2 = \begin{pmatrix} 1 & 6 & 4 & 8 & 4 & 5 & 8 & 9 \\ 9 & 1 & 6 & 4 & 8 & 4 & 5 & 8 \\ 8 & 9 & 1 & 6 & 4 & 8 & 4 & 5 \\ 5 & 8 & 9 & 1 & 6 & 4 & 8 & 4 \\ 4 & 5 & 8 & 9 & 1 & 6 & 4 & 8 \\ 8 & 4 & 5 & 8 & 9 & 1 & 6 & 4 \\ 4 & 8 & 4 & 5 & 8 & 9 & 1 & 6 \\ 6 & 4 & 8 & 4 & 5 & 8 & 9 & 1 \end{pmatrix}$$

The matrix $M_0$ from the above described matrixes $M_0$, $M_1$ and $M_2$ is an 8×8 matrix used in the Whirlpool algorithm described earlier; the matrixes $M_1$ and $M_2$ are matrixes selected from matrixes satisfying the constraint condition of the Feistel encryption/decryption algorithm. Linear transform making use of an F function based on the three matrixes $M_0$, $M_1$ and $M_2$ different from each other is carried out in rounds in accordance with the Feistel encryption/decryption algorithm. It is to be noted that every element of each of the matrixes represents an element on the finite body GF ($2^8$) whereas its irreducible polynomial is expressed by an expression of $t^8+t^4+t^3+t^2+1$.

It is to be noted that the above description has explained a configuration in which a linear transform matrix is used in linear transform processes carried out by using an F function in rounds as a common matrix shared with the AES or Whirlpool in typical Feistel-type common key block encryption/decryption processing. However, as for a transform table used in a nonlinear transform, it is possible to use a nonlinear transform table used in the AES algorithm in a nonlinear transform processing based on, for example, 64-bit Feistel-type common key block encryption/decryption processing; it is possible to use a nonlinear transform table used in the Whirlpool algorithm in a nonlinear transform processing based on, for example, 128-bit Feistel-type common key block encryption/decryption processing.

That is to say, an encryption/decryption processing device of the present invention employs an encryption/decryption processing section for carrying out Feistel-type common key block encryption/decryption processing repeating an SP-type F function used in execution of data transform processing including nonlinear and linear transform processes in a plurality of rounds. The encryption/decryption processing device is characterized in that the encryption/decryption processing section is configured to carry out at least one of the nonlinear and linear transform processes applying the F function executed in the rounds as a transform process identical with a transform process applying an encryption/decryption algorithm other than the algorithm of the Feistel-type common key block encryption/decryption or another hash function. By this configuration, the design cost can be reduced by sharing common components and the amount of data stored in a memory can be reduced. More specifically, by making at least some hardware and software required for carrying out nonlinear and linear transforms as hardware and software common to the processes in different kinds of encryption/decryption processing based on different algorithms and different hash functions, a hardware implementation cost can be reduced, and a code size can be reduced by making use of common modules in the implementation of some software.

[5. Typical Configuration of the Encryption/Decryption Processing Device]

Figure 5:
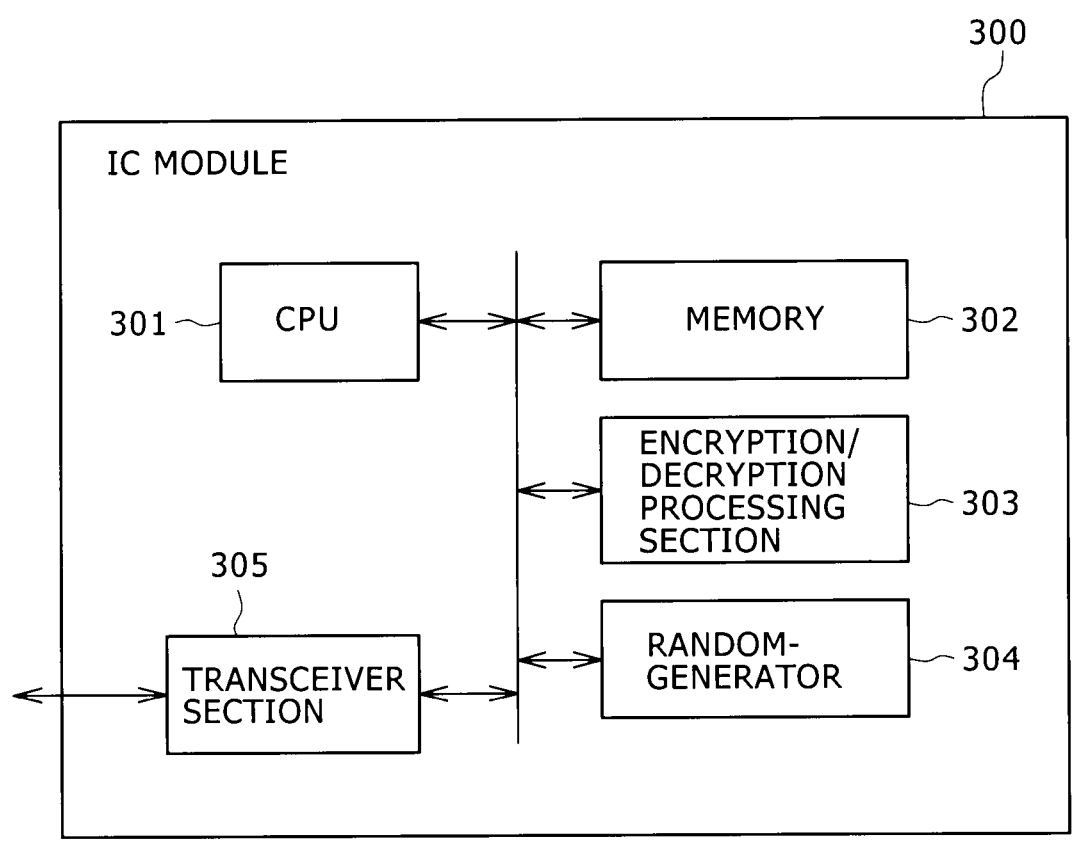
FIG. 5 is a diagram showing the configuration of an IC module serving as an encryption/decryption processing device for carrying out encryption/decryption processing according to the present invention.

Finally, an IC module 300 serving as an encryption/decryption processing device for carrying out encryption/decryption processing is explained by referring to FIG. 5. The processing described above can be carried out by typically a PC, an IC card, a reader/writer and a variety of other information processing device. The IC module 300 shown in FIG. 5 can be configured to function as any one of these devices.

A CPU (Central Processing Unit) 301 shown in FIG. 5 is a processor for starting and ending the encryption/decryption processing, controlling data transceiving, controlling data transfers among other components employed therein as well as executing a variety of programs. A memory 302 is a ROM (Read-Only-Memory) for storing the programs to be executed by the CPU 301 and fixed data such as calculation parameters. The memory 302 also includes typically a RAM (Random Access Memory) to be used as storage and work areas for storing a program being executed by the CPU 301 and parameters which are changed properly in the program processing. In addition, the memory 302 can also be used as a storage area for storing keys required in the encryption/decryption processing, data for transform tables (substitution tables) being utilized in the encryption/decryption processing and data of transform matrixes also being utilized in the encryption/decryption processing. In addition, it is desirable to configure the data storage area as a memory having a tamper-proof structure.

an encryption/decryption processing section 303 carries out typically encryption and decryption processes according to the Feistel-type common key block encryption/decryption algorithm described earlier, the AES algorithm, the encryption/decryption processing and the hash function such as Whirlpool. Meanwhile, here, the encryption/decryption processing means is provided as a separated module. However, instead of providing the encryption/decryption processing module, it is also possible to provide a typical configuration in which an encryption/decryption processing program is stored in the ROM, and the CPU 301 reads out to execute the program stored in the ROM.

A random-number generator 304 is a section for carrying out a process to generate a random number which is required for generating a key to be used in an encryption/decryption process.

A transceiver section 305 is a data communications processing section for executing data communication with externals. For example, it executes data communication with the IC module such as a reader/writer to execute output of an encrypted text generated in the IC module, alternatively, to execute input data from the external devices such as a reader/writer.

In the IC module 300, when the configuration thereof enables two different algorithms of the AES algorithm and the Feistel-type common key block encryption/decryption processing algorithm making use of a plurality of matrixes (linear transform matrixes) different from each other to be executed, the amount of data to be stored in the memory 302 as data of the linear transform matrix can be reduced by sharing some matrixes for the Feistel-type common key block encryption/decryption processing algorithm with matrixes for the AES algorithm In addition, by the same token, when the configuration enables the two other different algorithms of the Whirlpool hash function and the Feistel-type common key block encryption/decryption processing algorithm making use of a plurality of matrixes (linear transform matrixes) different from each other to be executed, the amount of data to be stored in the memory 302 as data of the linear transform matrix can be reduced by sharing some matrixes for the Feistel-type common key block encryption/decryption algorithm with matrixes for the Whirlpool hash function.

Hereinabove, the present invention has been explained with reference to specific embodiments. However, it is self-apparent that a person skilled in the art is capable of modifying the embodiment and/or providing a substitute for any of the embodiments within a range not departing from the gist of the present invention. That is to say, the above description has exemplified the present invention in detail by providing some typical embodiments. Thus, the typical embodiments are not to be interpreted as non-exhaustive examples. That is to say, appended claims should be referred to in order to determine the gist of the present invention.

It is to be noted that the series of processes described in this specification can be carried out by hardware and/or execution of software. When the processes are carried out by software, the programs in which processing sequences are stored can be installed into a memory inside a computer embedded in dedicated hardware and then the programs are executed, alternatively, the programs can be installed into a general-purpose personal computer is a personal computer which can carry out a variety of functions and then the programs are executed.

For examples, the programs can be stored in advance in a hard disk or a ROM (Read Only Memory)) as a recording medium. As an alternative, the programs can also be stored (recorded) temporarily or permanently in a removable recording medium such as a flexible disk, a CD-ROM (Compact Disc Read Only Memory), an MO (Magnetic optical) disk, a DVD (Digital Versatile Disc), a magnetic disk or a semiconductor memory. These removable recording medium can be provided as, so-called, package software.

It is to be noted that, the programs can be installed from the above described removable recording medium to a computer. Alternatively, the programs can be installed from a download site by way of radio transmission or by way of wire communication via a network such as a LAN (Local Area Network) and Internet to a computer. The computer, which receives the programs transferred like above, can install them to a recording medium such as a hard disk incorporated therein.

It is to be noted that a variety of processes described in this specification can be carried out not only in a pre-prescribed order along the time axis, but also concurrently or individually depending on need or the processing capability of the processing device carrying out the processes. In addition, the technical term 'system' used in this specification implies the configuration of a logical confluence including a plurality of devices without regard to whether or not the device are incorporated in the same cabinet.

Industrial Applicability

As described above, in accordance with the present invention, in Feistel-type common key block encryption/decryption processing executed by repeating an SP-type F function including nonlinear and linear transform sections in a plurality of rounds, at least one of the nonlinear and linear transform processes applying the F function executed in the rounds is carried out as a transform process identical with a transform process applying an encryption/decryption algorithm other than the algorithm of the Feistel-type common key block encryption/decryption or another hash function, for example, an AES or Whirlpool. With such a configuration, a design cost can be reduced and the amount of data stored in a memory can be decreased due to the use of the common components. That is to say, a hardware implementation cost can be reduced by making at least some hardware or software required for carrying out the nonlinear and linear transforms as hardware or software common in the processes in different kinds of encryption/decryption processing based on different algorithms or different hash functions. In addition, a code size can be reduced by making use of common modules in the implementation of at least some software required for carrying out the processes.

The invention claimed is:

1. An encryption/decryption processing device comprising
a memory configured to store a matrix used in an encryption/decryption algorithm or a hash function other than a Feistel-type common key block encryption/decryption;
an encryption/decryption processing section configured to carry out Feistel-type common key block encryption/decryption processing repeating an SP-type F function used in execution of data transform processing including nonlinear and linear transform processes in a plurality of rounds, wherein
said encryption/decryption processing section is configured to carry out at least one of transform processings of the nonlinear and linear transform processes applying the F function executed in the rounds using the matrix stored in the memory.

2. The encryption/decryption processing device according to claim 1, wherein
said encryption/decryption processing section is configured to selectively apply at least two or more matrixes different from each other to the linear transform process carried out in the rounds and at least one of the selected matrixes is the matrix stored in the memory.

3. The encryption/decryption processing device according to claim 2, wherein
said encryption/decryption processing section is configured to selectively apply two matrixes $M_0$ and $M_1$ different from each other to the linear transform process carried out in the rounds in such a way that the order of application of the two matrixes $M_0$ and $M_1$ different from each other satisfies the following conditions (a) and (b):
(a) $M_0$ is followed by $M_1$ in a sequence of the odd-numbered rounds;
(b) $M_0$ is followed by $M_1$ in a direction starting from the last stage in the sequence of the even-numbered rounds.

4. The encryption/decryption processing device according to claim 2, wherein
said encryption/decryption processing section is configured to selectively apply three matrixes $M_0$, $M_1$ and $M_2$ different from each other to the linear transform process carried out in the rounds in such a way that the order of application of the three matrixes $M_0$, $M_1$ and $M_2$ different from each other satisfies the following conditions (a) and (b):
(a) $M_0$ is followed by $M_1$ to be followed by $M_2$ in a sequence of the odd-numbered rounds;
(b) $M_0$ is followed by $M_1$ to be followed by $M_2$ in a direction starting from the last stage in the sequence of the even-numbered rounds.

5. The encryption/decryption processing device according to claim 1, wherein:
said encryption/decryption processing section is configured to carry out 64-bit Feistel-type common key block encryption/decryption processing; and
at least one of matrixes selected as matrixes to be used in the linear transform process carried out in the rounds is a matrix applied to an AES encryption/decryption algorithm.

6. The encryption/decryption processing device according to claim 5, wherein said encryption/decryption processing section is configured to selectively implement algorithms of both the AES encryption/decryption processing and the 64-bit Feistel-type common key block encryption/decryption processing.

7. The encryption/decryption processing device according to claim 1 wherein:
said encryption/decryption processing section is configured to carry out 128-bit Feistel-type common key block encryption/decryption processing; and
at least one of matrixes selected as matrixes to be used in the linear transform process carried out in the rounds is a matrix applied to a Whirlpool hash function.

8. The encryption/decryption processing device according to claim 7, wherein
said encryption/decryption processing section is configured to selectively implement the algorithms of both the Whirlpool hash function and the 128-bit Feistel-type common key block encryption/decryption processing.

9. An encryption/decryption processing method comprising
providing a memory that stores a matrix used in an encryption/decryption algorithm or a hash function other than a Feistel-type common key block encryption/decryption; and
an encryption/decryption processing step of carrying out Feistel-type common key block encryption/decryption processing repeating an SP-type F function used in execution of data transform processing including nonlinear and linear transform processes in a plurality of rounds, wherein said encryption/decryption processing step is executed to carry out at least one of transform processings of the nonlinear and linear transform processes applying the F function executed in the rounds using the matrix stored in the memory.

10. The encryption/decryption processing method according to claim 9, wherein said encryption/decryption processing step is executed to selectively apply at least two or more matrixes different from each other to the linear transform process carried out in the rounds and at least one of the selected matrixes is the matrix stored in the memory.

11. The encryption/decryption processing method according to claim 10, wherein said encryption/decryption processing step is executed to selectively apply two matrixes $M_0$ and $M_1$ different from each other to said linear transform process carried out in the rounds in such a way that the order of application of the two matrixes $M_0$ and $M_1$ satisfies the following conditions (a) and (b):

(a) $M_0$ is followed by $M_1$ in a sequence of the odd-numbered rounds;

(b) $M_0$ is followed by $M_1$ in a direction starting from the last stage in the sequence of the even-numbered rounds.

12. The encryption/decryption processing method according to claim 10, wherein said encryption/decryption processing step is executed to selectively apply three matrixes $M_0$, $M_1$ and $M_2$ different from each other to the linear transform process carried out in the rounds in such a way that the order of application of the three matrixes $M_0$, $M_1$ and $M_2$ satisfies the following conditions (a) and (b):

(a) $M_0$ is followed by $M_1$ to be followed by $M_2$ in a sequence of the odd-numbered rounds;

(b) $M_0$ is followed by $M_1$ to be followed by $M_2$ in a direction starting from the last stage in the sequence of the even-numbered rounds.

13. The encryption/decryption processing method according to claim 9, wherein:

said encryption/decryption processing step is a step of carrying out 64-bit Feistel-type common key block encryption/decryption processing; and at least one of matrixes selected as matrixes to be used in the linear transform process carried out in the rounds is a matrix applied to an AES encryption/decryption algorithm.

14. The encryption/decryption processing method according to claim 9, wherein:

said encryption/decryption processing step is a step of carrying out 128-bit Feistel-type common key block encryption/decryption processing; and at least one of matrixes selected as matrixes to be used in the linear transform process carried out in the rounds is a matrix applied to a Whirlpool hash function.

15. A non-transitory computer readable medium encoded thereon with a computer program that when executed b a computer causes the computer to perform a method for driving an encryption/decryption processing device to carry out encryption/decryption processing, said computer program comprising obtaining a matrix used in an encryption/decryption algorithm or a hash function other than a Feistel-type common key block encryption/decryption; and an encryption/decryption processing step of carrying out Feistel-type common key block encryption/decryption processing repeating an SP-type F function used in execution of data transform processing including nonlinear and linear transform processes in a plurality of rounds as a step for being executed in an encryption/decryption processing section, wherein said encryption/decryption processing step is a step of carrying out at least one of the nonlinear and linear transform processes applying the F function executed in the rounds as using the obtained matrix.

* * * * *